United States Patent [19]

De Meulemeester et al.

[11] Patent Number: 5,356,445
[45] Date of Patent: Oct. 18, 1994

[54] PROCESS FOR DYEING NATURAL OR SYNTHETIC POLYAMIDE FIBRE MATERIAL WITH DYE MIXTURES

[75] Inventors: Christian De Meulemeester, Allschwil, Switzerland; Patrick Runser, Michelbach-le-Bas, France

[73] Assignee: Ciba-Geigy Corporation, Ardsley, N.Y.

[21] Appl. No.: 126,816

[22] Filed: Sep. 24, 1993

[30] Foreign Application Priority Data

Sep. 30, 1992 [CH] Switzerland .......................... 3048/92

[51] Int. Cl.$^5$ .......................... D06P 1/39; D06P 3/06; D06P 3/16; D06P 3/852
[52] U.S. Cl. .......................................... 8/641; 8/643; 8/681; 8/682; 8/683; 8/684; 8/692; 8/676; 8/903; 8/907; 8/917; 8/924
[58] Field of Search ................... 8/641, 643, 681-684, 8/676, 638, 903, 917, 924, 907, 692

[56] References Cited

U.S. PATENT DOCUMENTS

| | | | |
|---|---|---|---|
| 4,285,691 | 8/1981 | Egli | 8/455 |
| 4,411,665 | 10/1983 | Egli | 8/455 |
| 4,444,564 | 4/1984 | Salathé et al. | 8/588 |
| 4,563,192 | 1/1986 | Salathe | 8/554 |
| 4,623,358 | 11/1986 | Back | 8/620 |
| 4,652,269 | 3/1987 | Bowles | 8/641 |
| 4,681,596 | 7/1987 | Back | 8/620 |
| 4,818,248 | 4/1989 | Back | 8/620 |
| 4,954,563 | 9/1990 | Hurter | 534/783 |
| 5,094,665 | 3/1992 | Mausezahl | 8/641 |
| 5,131,919 | 7/1992 | Mausezahl | 8/643 |

FOREIGN PATENT DOCUMENTS

| | | |
|---|---|---|
| 0089004 | 9/1983 | European Pat. Off. . |
| 0135198 | 3/1985 | European Pat. Off. . |
| 0163608 | 12/1985 | European Pat. Off. . |
| 0181292 | 5/1986 | European Pat. Off. . |
| 0387201 | 9/1990 | European Pat. Off. . |
| 0443631 | 8/1991 | European Pat. Off. . |
| 8001577 | 8/1980 | PCT Int'l Appl. . |
| 0181535 | 4/1936 | Switzerland . |
| 0844427 | 8/1960 | United Kingdom . |
| 0945806 | 1/1964 | United Kingdom . |
| 2017135 | 10/1979 | United Kingdom . |
| 2147319 | 5/1985 | United Kingdom . |
| 2201691 | 9/1988 | United Kingdom . |

*Primary Examiner*—Paul Lieberman
*Assistant Examiner*—Margaret Einsmann
*Attorney, Agent, or Firm*—Kevin T. Mansfield

[57] ABSTRACT

The invention relates to a process for dyeing natural or synthetic polyamide fiber material from an aqueous liquor, in the presence of a levelling assistant and in the presence or absence of an alkali metal fluorosilicate or ammonium fluorosilicate, which process comprises the use of a mixture of the dyes of formulae (1), (2) and (3) or a mixture of the dyes of formulae (4) and (5), or a mixture which contains the dye of formula (6) together with at least one dye of formulae (7), (8) and (9), which dyes of fomaulae (1) to (9) are as defined in claim 1.

The inventive process is suitable for dyeing natural or synthetic polyamide fiber material to give dyeings of fiber and surface levelness having good fastness properties.

12 Claims, No Drawings

PROCESS FOR DYEING NATURAL OR SYNTHETIC POLYAMIDE FIBRE MATERIAL WITH DYE MIXTURES

It is the object of the present invention to provide a process for dyeing natural and synthetic polyamide fibre materials, which process produces dyeings of good levelness and good fastness properties and with which both components of wool/polyamide blends can be dyed tone-in-tone. The process shall also be suitable for trichromatic dyeing.

It has been found that the process described in this specification meets the above requirements.

Accordingly, the invention relates to a process for dyeing natural or synthetic polyamide fibre material from an aqueous liquor, in the presence of a levelling assistant and in the presence or absence of an alkali metal fluorosilicate or ammonium fluorosilicate, which process comprises the use of a mixture of dyes of formulae (1), (2) and (3)

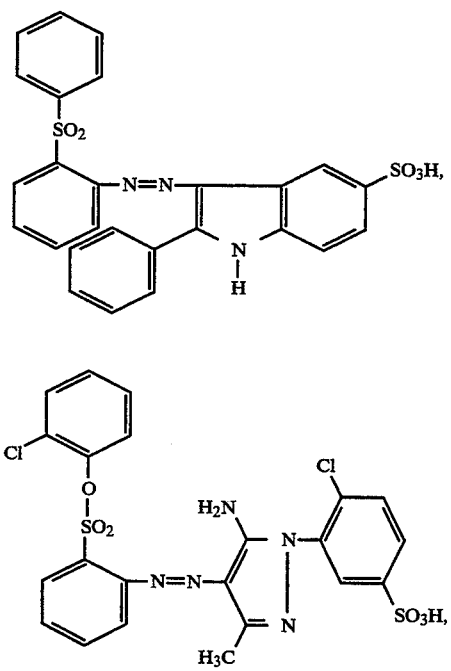

(1)

(2)

(3)

or a mixture of dyes of formulae (4) and (5)

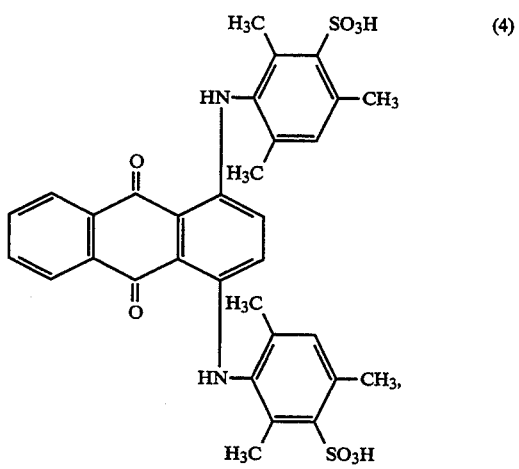

(4)

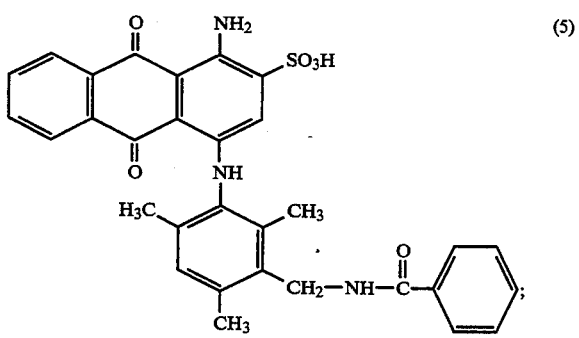

(5)

or a mixture that comprises a dye of formula (6)

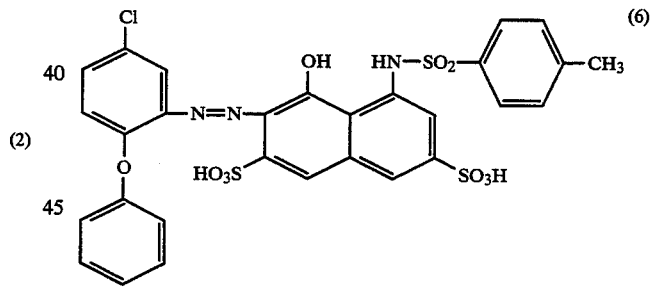

(6)

together with at least one dye of formulae (7), (8) and (9)

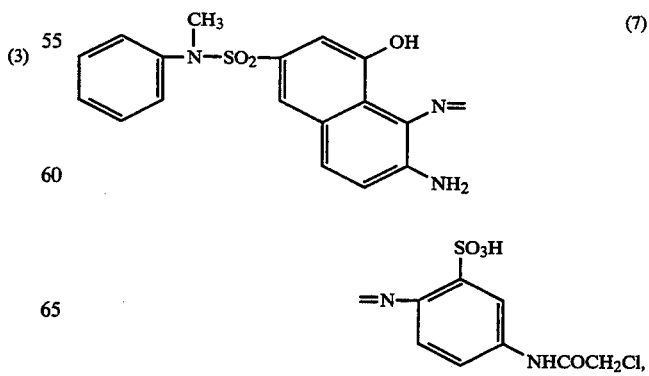

(7)

-continued

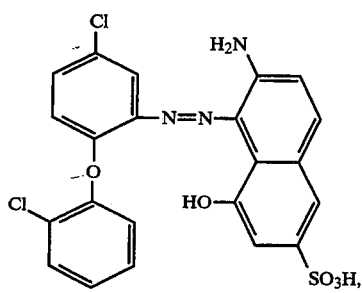
(8)

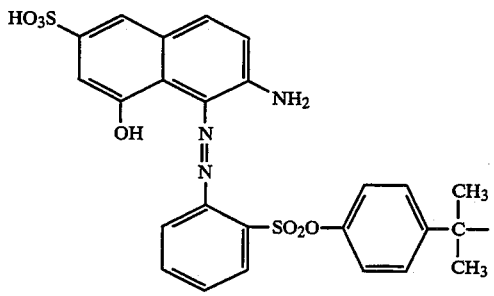
(9)

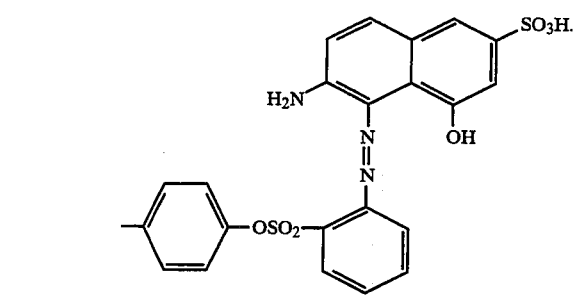

Suitable levelling asssitants are preferably those that comprise a compound of formula

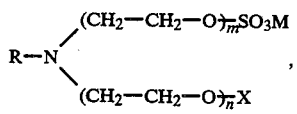
(10)

wherein X is hydrogen or a radical of formula —$SO_3M$, R is an alkyl or alkenyl radical of 12 to 24 carbon atoms, M is hydrogen, alkali metal or ammonium, and m and n are whole numbers, the sum of m and n being 2 to 20,

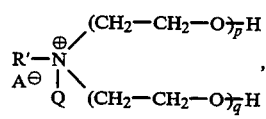
(11)

wherein R', independently of R, has the meaning of R, A is an anion, Q is an unsubstituted or substituted alkyl radical and p and q are whole numbers, the sum of p and q being 2 to 50, and

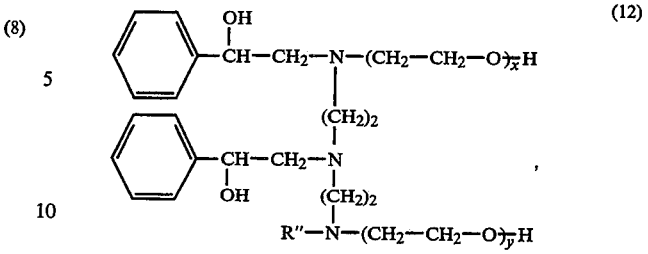
(12)

wherein R", independently of R, has the meaning of R, and x and y are whole numbers, the sum of x and y being 80 to 140; or levelling assistants which comprise a compound of formula

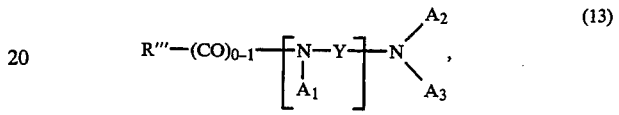
(13)

wherein R''' is $C_{12}$-$C_{30}$alkyl or $C_{12}$-$C_{30}$alkenyl, Y is $C_2$-$C_3$alkylene, $A_1$, $A_2$ and $A_3$ are each the radical of an ethylene oxide addition chain or of an ethylene oxide/$C_3$-$C_4$alkylene oxide addition chain to which styrene oxide may be added, the compound of formula (13) containing 3 to 200 ethyleneoxy units, 0 to 100 $C_3$-$C_4$alkyleneoxy units and, where appropriate, up to 5 styreneoxy units, and r is 0 or an integer from 1 to 6.

X in the compound of formula (10) is preferably hydrogen.

R, R', R" and R''' are each independently of one another preferably alkyl or alkenyl of 16 to 22 carbon atoms.

The sum of n and m in the compound of formula (10) is preferably 6 to 16.

The sum of p and q in the compound of formula (11) is preferably 6 to 40.

The sum of x and y in the compound of formula (12) is preferably 100 to 110.

Q may suitably be $C_1$-$C_4$alkyl, typically methyl, ethyl, n-propyl, isopropyl, n-butyl, isobutyl, sec-butyl and tert-butyl, as well as —$CH_2$—CO—$NH_2$, —$CH_2$—CH(OH)—$CH_2$Cl or —$CH_2$—CH(OH)Cl. Methyl or —$CH_2$—CO—$NH_2$ is preferred.

Suitable anions $A^-$ are those that are derived from quarternising agents such as acetyl bromide, ethyl bromide, ethylene chlorohydrin, ethylene bromohydrin, epichlorohydrin, epibromohydrin, dimethyl sulfate, diethyl sulfate or chloroacetamide.

It is preferred to use those compounds of formula (10), wherein X is hydrogen, the sum of n and m is 10 to 16, and R is alkyl or alkenyl of 16 to 22 carbon atoms.

It is preferred to use those compounds of formula (11), wherein Q is methyl, the sum of p and q is 30 to 40 and R' is alkyl or alkenyl of 16 to 22 carbon atoms, or wherein Q is —$CH_2$—CO—$NH_2$, the sum of p and q is 5 to 10 and R' is alkyl or alkenyl of 16 to 22 carbon atoms.

It is preferred to use those compounds of formula (12), wherein the sum of x and y is 100 to 110 and R" is alkyl or alkenyl of 16 to 22 carbon atoms.

It is especially preferred to use levelling agents containing 5 to 70 parts by weight of the compound of formula (10), 15 to 60 parts by weight of the compound of formula (11) and 5 to 60 parts by weight of the compound of formula (12), based on 100 parts by weight of the levelling agent mixture.

It is more particularly preferred to use a compound of formula (10) together with a compound of formula (11), wherein Q is methyl, a compound of formula (11), wherein Q is the radical —CH$_2$CO—NH$_2$, and a compound of formula (12). The preferred meanings given above in connection with the compounds of formulae (10), (11) and (12) apply here.

A$_1$, A$_2$ and A$_3$ in the compound of formula (13) are preferably ethyleneoxy radicals.

Y in the compound of formula (13) is preferably n-propylene.

r in the compound of formula (13) is preferably 1.

R''' in the compound of formula (13) is preferably alkyl or alkenyl of 16 to 22, preferably of 22, carbon atoms.

Particularly preferred compounds of formula (13) are those of formula $$R'''-\underset{A_1}{\underset{|}{N}}-Y-N\diagup^{A_2}_{A_3} \quad (14)$$

wherein A$_1$, A$_2$ and A$_3$, Y and R''' have the meanings and preferred meanings given above.

The amounts in the levelling assistant is added to the dyebaths can vary over a wide range. In general, an amount of 0.3 to 5% by weight, preferably 0.5 to 4% by weight and, most preferably, 1 to 2% by weight, based on the fibre material, has proved advantageous.

The alkali metal fluorosilicates or ammonium fluorosilicates suitable for use in the process of this invention may be alkali metal salts or ammonium salts of hexafluorosilicic acid or mixtures thereof. Preferred salts are Na$_2$SiF$_6$ or, more particularly, (NH$_4$)$_2$SiF$_6$.

The amount in which the alkali metal fluorosilicates or ammonium fluorosilicates are added to the dyebaths is preferably from 5 to 100% by weight, based on the amount of levelling assistant, and is most preferably 5 to 40% by weight.

If a levelling assistant of formula (13) is used, dyeing is preferably carried out in the absence of an alkali metal fluorosilicate or ammonium fluorosilicate.

As mixture of a dye of formula (6) together with at least one dye of formulae (7), (8) and (9) it is preferred to use a mixture of the dye of formula (6) with a dye of formula (7), or a mixture of the dye of formula (6) with a dye of formula (8) and a dye of formula (9).

The dye mixtures preferably contain the individual components in an amount of 1 to 95 parts, based on 100 parts of the dye mixture.

The mixture of the dyes of formulae (1), (2) and (3) preferably contains 1 to 20 parts of the dye of formula (1), 5 to 50 parts of the dye of formula (2), and 40 to 90 parts of the dye of formula (3), based on 100 parts of the dye mixture.

The mixture of the dyes of formulae (4) and (5) preferably contains 10 to 90 parts of the dye of formula (4) and 10 to 90 parts of the dye of formula (5), based on 100 parts of the dye mixture.

The mixture of the dyes of formulae (6) and (7) preferably contains 5 to 40 parts of the dye of formula (6) and 60 to 95 parts of the dye of formula (7), based on 100 parts of the dye mixture.

The mixture of dyes of formulae (6), (8) and (9) preferably contains 5 to 50 parts of the dye of formula (6), 10 to 70 parts of the dye of formula (8), and 5 to 50 parts of the dye of formula (9).

The dyes of formulae (1) to (9) are either in the form of their free sulfonic acid or, preferably, as salts thereof, typically the alkali metal salts, alkaline earth metal salts or ammonium salts, or as salts of an organic amine. Typical examples are the sodium, lithium or ammonium salts or the salt of triethanolamine.

The dyes of formulae (1) to (9) and the levelling assistants of formulae (10), (11), (12) and (13) are known or can be obtained by methods analogous to known ones.

The amounts in which the defined dye mixtures are added to the dyebaths can vary over a wide range, depending on the desired depth of shade. In general, amounts of 0.01 to 10% by weight, based on the fibre material, have proved useful.

Dyeing is preferably carried out at pH 3–7, more particularly at pH 3–5 and, most preferably, at pH 3–4.

In addition to containing the indicated assistants, the dyebaths may contain further customary ingredients such as wool protective agents, wetting agents and antifoams.

The liquor to goods ratio may be chosen over a wide range from 1:5 to 1:80, preferably from 1:8 to 1:25.

Dyeing is normally carried out from an aqueous liquor in the temperature range from 80° to 105° C., or at 110° C. when using a wool protective agent that splits off formaldehyde, but, preferably in the temperature range from 95° to 103° C. Dyeing by the exhaust process is preferred.

The dyeing time is normally from 30 to 120 minutes, preferably from 60 to 120 minutes.

The process of this invention does not require special apparatus. The conventional dyeing machines can be used, typically for flocks, slubbing, hanks, packages, piece goods and carpets.

The inventive process is suitable for dyeing not only natural polyamide fibre materials such as silk or, preferably, wool, but also for dyeing synthetic polyamide fibre materials such as polyamide 6 or polyamide 66; and it is suitable for dyeing blends of wool and synthetic polyamide wovens or yarns. Preferred is the dyeing of wool or blends of wool and synthetic polyamide material.

The above mentioned textile material can be in any form of presentation, typically fibres, yarn, wovens, knitgoods, and in the form of carpets.

A particularly preferred embodiment of the novel process is a process for trichromatic dyeing, which process comprises the use of a yellow or orange dyeing mixture of the dyes of formulae (1), (2) and (3) together with a blue dyeing mixture of the dyes of formulae (4) and (5) and a red dyeing mixture which comprises the dye of formula (6) together with at least one dye of formulae (7), (8) and (9). By trichromatic dyeing is meant the additive blending of suitably chosen yellow, red and blue dyeing dyes in the amounts necessary for achieving the desired shade. The preferences stated above apply here to the mixtures of dyes.

The invention further relates to the mixture of the dyes of formulae (1), (2) and (3) as well as to the mixture of the dyes of formulae (4) and (5) and to the mixture which comprises the dye of formula (6) together with at least one dye of formulae (7), (8) and (9). The preferences stated above apply here to the mixtures of dyes.

The novel dye mixtures are distinguished by good allround fastness properties such as good lightfastness, good solubility, good fibre affinity and, in particular, good compatibility with other dyes and dye mixtures.

The novel process gives dyeings of very good levelness and good fastness properties. When dyeing wool/polyamide blends, both fibre components can be dyed tone-in-tone. In addition, the novel process, especially in trichromatic dyeing, is distinguished by uniform build-up, good affinity and good constancy of shade, also in different concentrations.

In the following Examples parts are by weight. The relationship between parts by weight and parts by volume is the same as that between the gram and the cubic centimeter.

EXAMPLE 1a)

To prepare a yellow dyeing dye mixture, 80 parts of the dye of formula

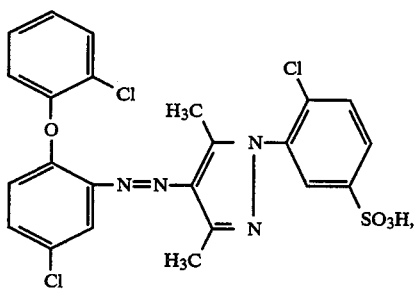

(101)

in the form of the free acid,
15 parts of the dye of formula

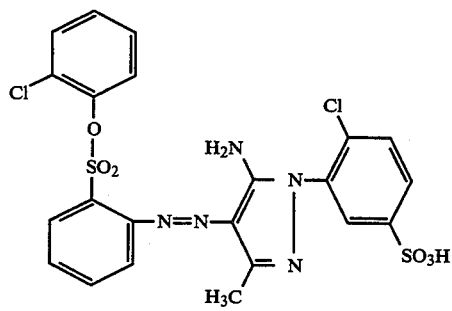

(102)

in the form of the free acid, and
5 parts of the dye of formula

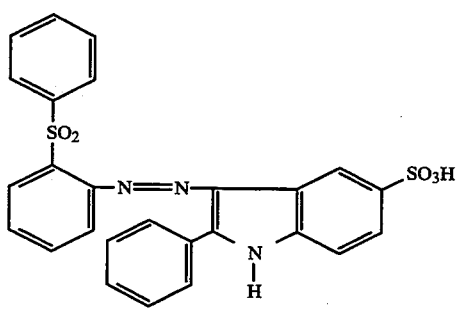

(103)

in the form of the free acid
are homogenised in a mixer to give 100 parts of the mixture hereinafter referred to as dye mixture A.

EXAMPLE 1b)

To prepare a red dyeing mixture,
82 parts of the dye of formula

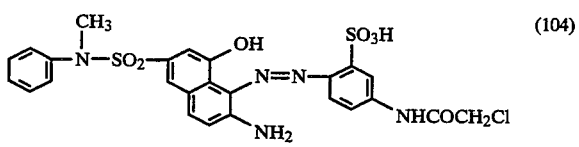

(104)

in the form of the free acid, and
18 parts of the dye of formula

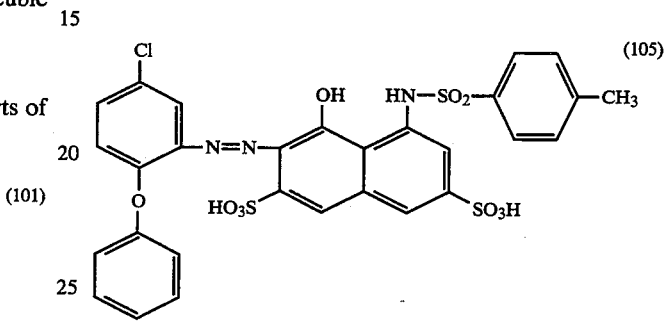

(105)

in the form of the free acid,
are homogenised in a mixer to give 100 parts of the dye mixture referred to hereinafter as dye mixture B.

EXAMPLE 1c)

To prepare a blue dyeing dye mixture
55 parts of the dye of formula

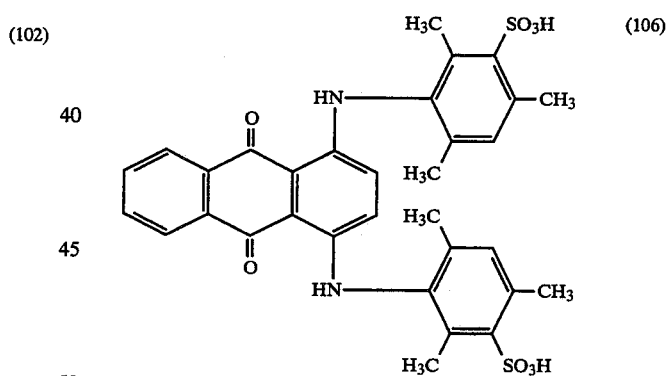

(106)

in the form of the free acid, and
45 parts of the dye of formula

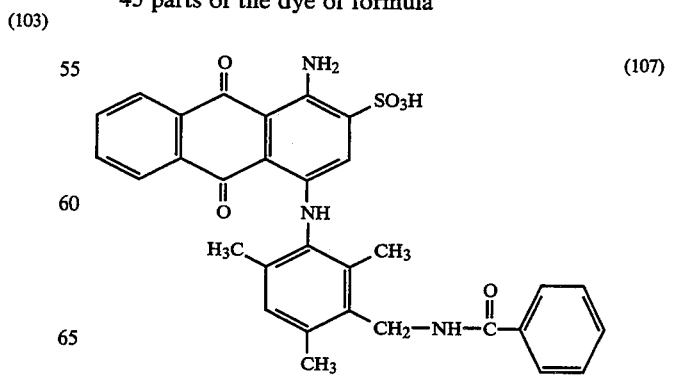

(107)

in the form of the free acid, are homogenised in a mixer to give 100 parts of the mixture referred to hereinafter as dye mixture C.

EXAMPLE 1d)

To prepare a red dyeing dye mixture
23 parts of the dye of formula

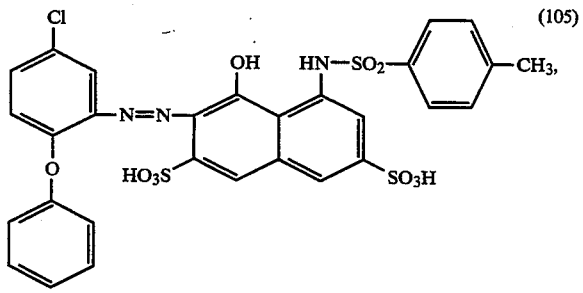
(105)

in the form of the free acid,
44 parts of the dye of formula

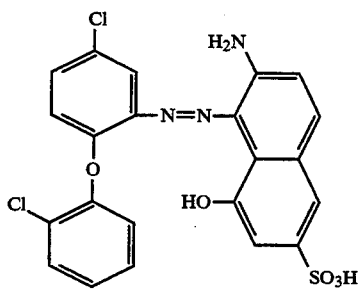
(108)

in the form of the free acid, and
33 parts of the dye of formula

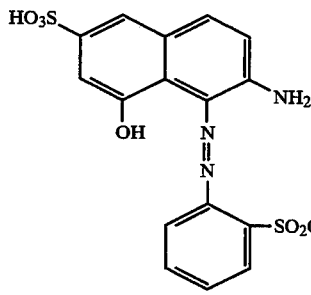

in the form of the free acid,
are homogenised in a mixer to give 100 parts of the mixture referred to hereinafter as dye mixture D.

EXAMPLE 2

100 parts of woollen fabric are pretreated for 15 minutes at 45° C. in a dyebath which contains, per 1500 parts of water of 40° C., 3 parts of a levelling assistant of the following composition:

20 parts of the anionic compound of formula

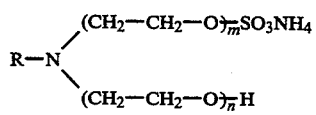

$R = C_{16}$-$C_{18}$ hydrocarbon radical, $m+n = 7.5$;

20 parts of the quarternary compound of formula

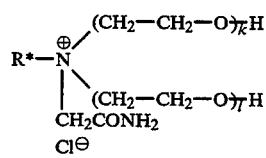

$R^* = C_{16}$-$C_{18}$ hydrocarbon radical, $K+1 = 7.5$;

5 parts of the quarternary compound of formula

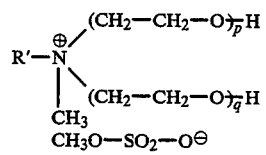

$R' = C_{18}$-$C_{22}$ hydrocarbon radical, $p+q = 34$; and 5 parts of the compound of formula

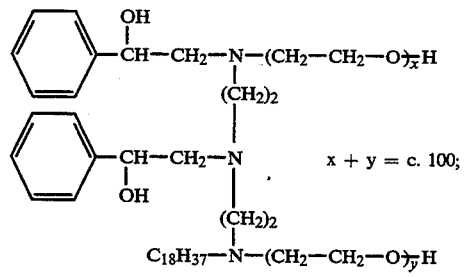

$x + y = $ c. 100;

and 50 parts of water, based on 100 parts of the levelling assistant composition;

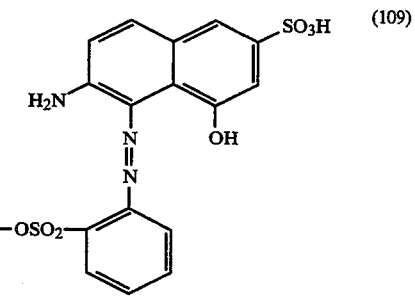
(109)

0.15 part of $(NH_4)_2SiF_6$ and 4 parts of formic acid (85%). The pH is 3.5. After addition of a solution containing 1.6 parts of dye mixture A, the dye liquor is kept for 10 minutes at 40° C. and then heated to 60° C. at a heating up rate of 1° C. per minute, kept for 20 minutes at this temperature and then heated to 100° C. at a heating up rate of 1° C. per minute. After a dyeing time of 90 minutes at 100° C., the dyebath is cooled to 50° C. and the liquor is discharged. The yellow dyed woollen fabric is washed and dried in conventional manner. The dyeing is level and has good fastness properties.

EXAMPLE 3

The procedure of Example 2 is repeated, but carrying out dyeing without the addition of $(NH_4)_2SiF_6$, to give a level yellow dyeing of good fastness properties.

EXAMPLE 4

The procedure of Example 2 is repeated, but replacing the levelling assistant used therein with 1 part of a levelling assistant of formula

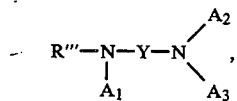

wherein R''' is a $C_{22}$ hydrocarbon radical Y is n-propylene and $A_1$, $A_2$ and $A_3$ are each an ethyleneoxy radical, to give a level yellow dyeing of good fastness properties.

EXAMPLES 5 TO 22

The procedure of Example 2 is repeated, but replacing 1.6 parts of dye mixture A with the dye mixtures listed in Table 1, or mixtures of yellow, red and blue dyeing dye mixtures, and also using in some cases 100 parts of a synthetic polyamide fabric instead of 100 parts of wool, to give dyeings which have the shades indicated in the table.

TABLE 1

| Ex. | Dye mixture | Shade on wool and synthetic polyamide |
|---|---|---|
| 5 | 0.065 part of dye mixture A | yellow |
| 6 | 0.13 part of dye mixture A | yellow |
| 7 | 0.26 part of dye mixture A | yellow |
| 8 | 0.8 part of dye mixture A | yellow |
| 9 | 0.18 part of dye mixture B | red |
| 10 | 0.36 part of dye mixture B | red |
| 11 | 0.74 part of dye mixture B | red |
| 12 | 2.2 parts of dye mixture B | red |
| 13 | 4.4 parts of dye mixture B | red |
| 14 | 0.115 part of dye mixture C | blue |
| 15 | 0.23 part of dye mixture C | blue |
| 16 | 0.46 part of dye mixture C | blue |
| 17 | 1.4 part of dye mixture C | blue |
| 18 | 2.8 part of dye mixture C | blue |
| 19 | 1.2 parts of dye mixture D | red |
| 20 | 0.85 part of dye mixture A, 0.62 part of dye mixture B and 0.42 part of dye mixture C | brown |
| 21 | 0.68 part of dye mixture A, 0.65 part of dye mixture B and 0.45 part of dye mixture C | brown |
| 22 | 0.68 part of dye mixture A, 0.65 part of dye mixture D and 0.45 part of dye mixture C | brown |

The procedure of Examples 5 to 22 is repeated, but carrying out dyeing without the addition of $(NH_4)_2SiF_6$, or replacing the levelling assistant used in Example 2 with 1 part of the levelling assistant used in Example 4, to give dyeings in the shades indicated in Table 1.

EXAMPLES 23 TO 29

The procedure described in Example 2 is repeated, but additionally adding at the start of the dyeing process 3 parts of a resist agent (condensate of aromatic sulfonic acids and formaldehyde) and replacing 1.6 parts of dye mixture A with the yellow, red or blue dyeing dye mixtures listed in Table 2, and replacing 100 parts of woollen fabric with 100 parts of a blend containing 80% wool and 20% synthetic polyamide (polyamide 6), to give dyeings in the shades indicated in Table 2. Both fibre components of the blend are dyed tone-in-tone.

TABLE 2

| Ex. | Dye mixture | Shade on wool/polyamide blends |
|---|---|---|
| 23 | 0.18 part of dye mixture A, 0.5 part of dye mixture B and 0.7 part of dye mixture C | reddish blue |
| 24 | 0.18 part of dye mixture A, 1.0 part of dye mixture B and 0.35 part of dye mixture C | bordeaux |
| 25 | 0.35 part of dye mixture A, 0.5 part of dye mixture B and 0.35 part of dye mixture C | brown |
| 26 | 0.35 part of dye mixture A and 1.0 part of dye mixture B | red |
| 27 | 1.0 part of dye mixture B and 0.7 part of dye mixture C | violet |
| 28 | 0.35 part of dye mixture A and 0.7 part of dye mixture C | green |
| 29 | 0.18 part of dye mixture A, 1.0 part of dye mixture D and 0.35 part of dye mixture C | bordeaux |

The procedure of Examples 23–29 is repeated, but carrying out dyeing without the addition of $(NH_4)_2SiF_6$, or replacing the levelling assistant used in Example 2 with 1 part of the levelling assistant used in Example 4, to give dyeings in the shades indicated in Table 2.

What is claimed is:

1. A process for dyeing natural or synthetic polyamide fibre material or both from an aqueous liquor in the presence of a levelling agent and optionally in the presence of an alkali metal fluorosilicate or ammonium fluorosilicate, which process comprises the use of a mixture of dyes of formula (1), (2) and (3)

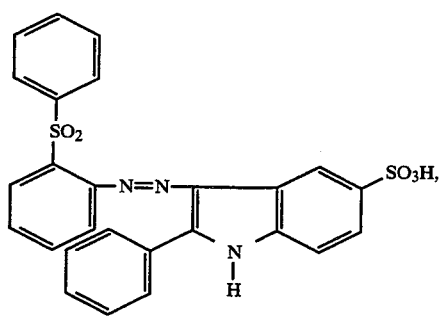

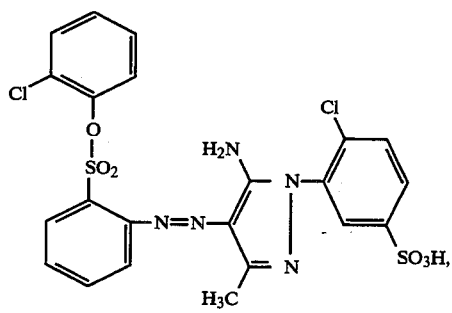

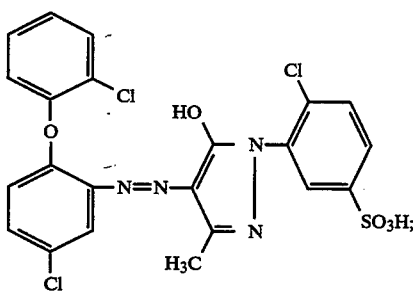

or a mixture of dyes of formulae (4) and (5)

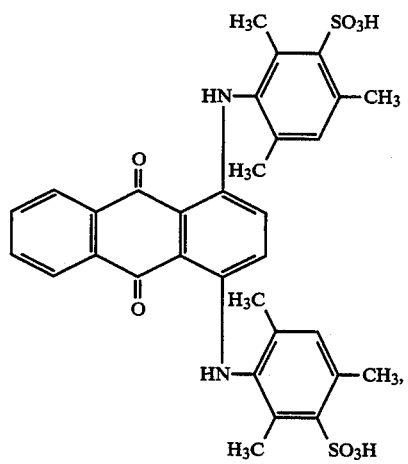

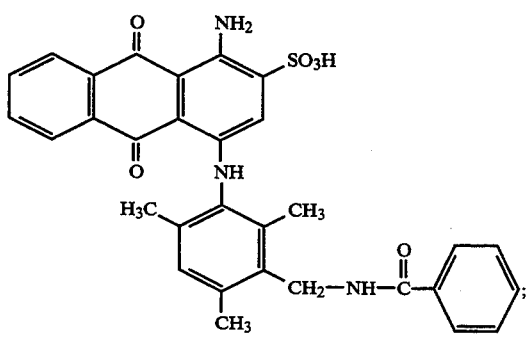

or a mixture that comprises a dye of formula (6)

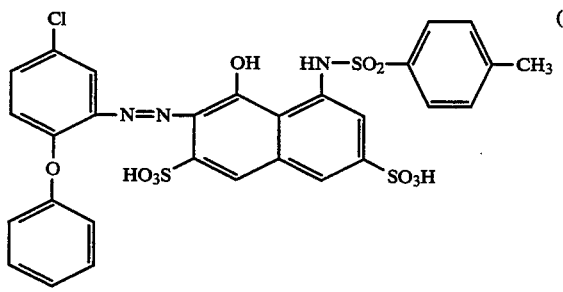

together with at least one dye of formula (7), (8) and (9).

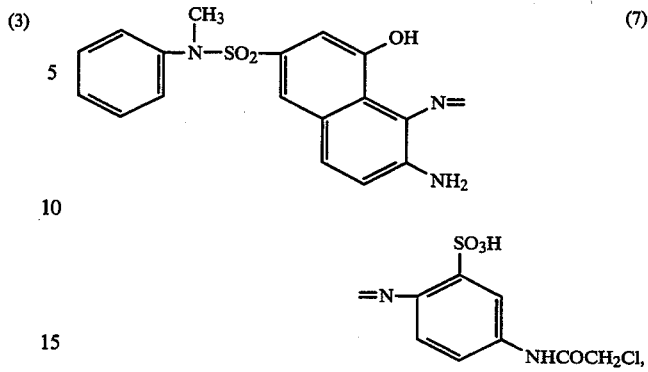

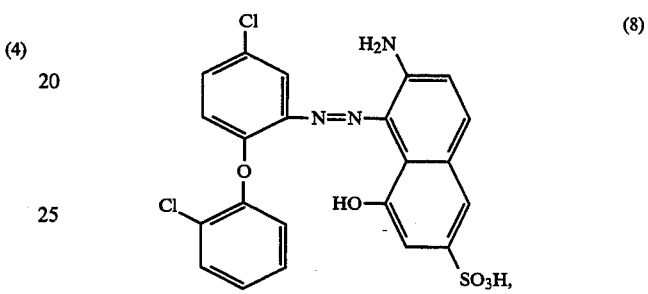

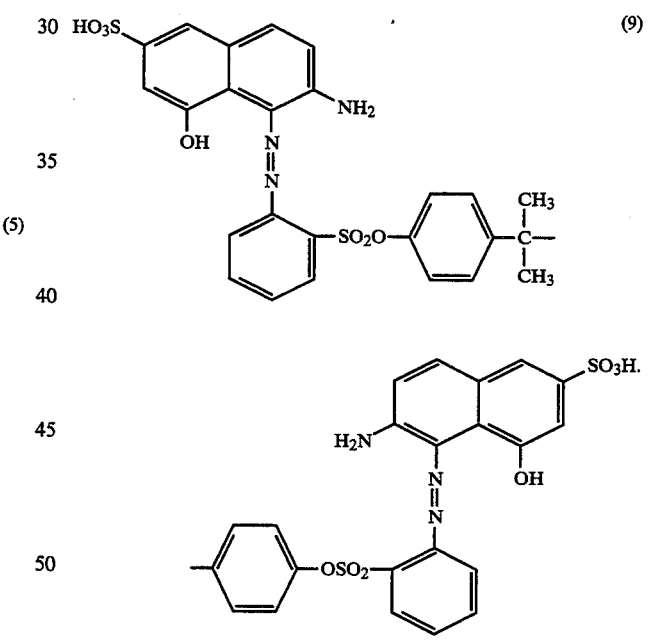

2. A process according to claim 1, wherein the levelling assistant comprises a compound of formula

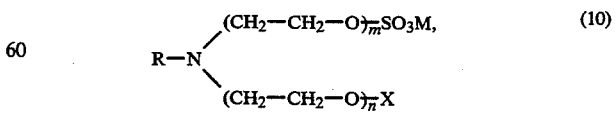

wherein X is hydrogen or a radical of formula $-SO_3M$, R is alkyl or alkenyl of 12 to 24 carbon atoms, M is hydrogen, alkali metal or ammonium, and m and n are whole numbers, the sum of m and n being 2 to 20,

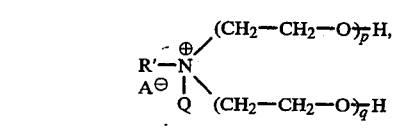
(11)

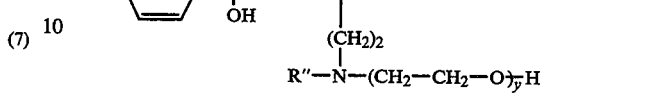
(12)

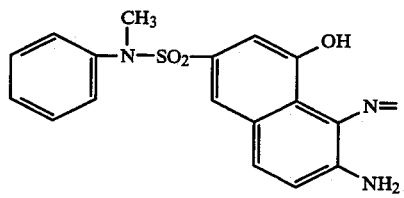
(7)

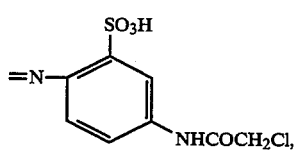

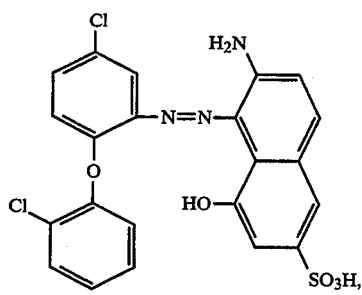
(8)

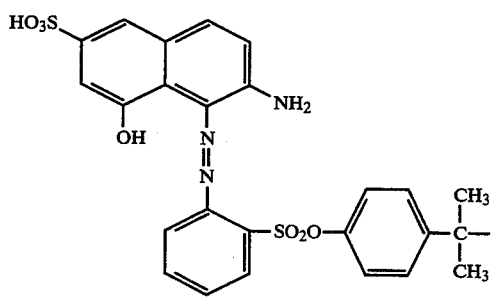
(9)

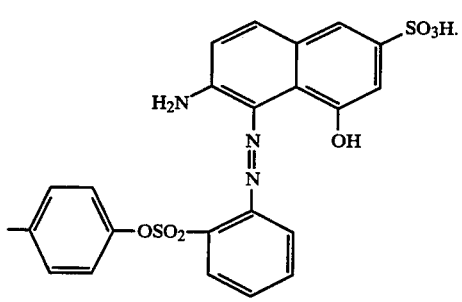

wherein R', independently of R, has the meaning of R, A is an anion, Q is an unsubstituted or substituted alkyl radical and p and q are whole numbers, the sum of p and q being 2 to 50, and wherein R", independently of R, has the meaning of R, and x and y are whole numbers, the sum of x and y being 80 to 140; or the levelling assistant comprises a compound of formula

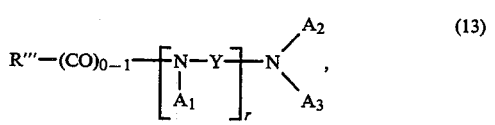
(13)

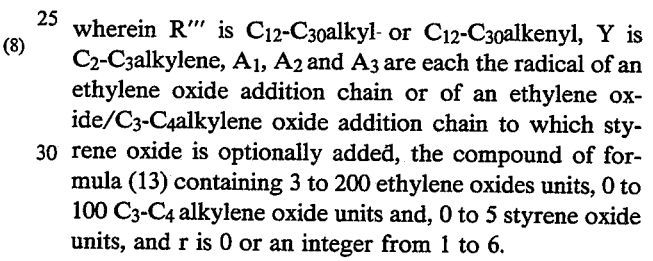

wherein $R'''$ is $C_{12}$-$C_{30}$alkyl- or $C_{12}$-$C_{30}$alkenyl, Y is $C_2$-$C_3$alkylene, $A_1$, $A_2$ and $A_3$ are each the radical of an ethylene oxide addition chain or of an ethylene oxide/$C_3$-$C_4$alkylene oxide addition chain to which styrene oxide is optionally added, the compound of formula (13) containing 3 to 200 ethylene oxides units, 0 to 100 $C_3$-$C_4$ alkylene oxide units and, 0 to 5 styrene oxide units, and r is 0 or an integer from 1 to 6.

3. A process according to claim 2, wherein the levelling assistant comprises the compounds of formulae (10), (11) and (12).

4. A process according to claim 2, wherein the levelling assistant comprises a compound of formula (13) and dyeing is carried out in the absence of an alkali metal fluorosilicate or ammonium fluorosilicate.

5. A process according to claim 1, wherein 0.3 to 5 percent by weight of levelling assistant is used, based on the fibre material.

6. A process according to claim 1, wherein dyeing is carried out in the pH range from 3 to 7.

7. A process according to claim 1, wherein dyeing is carried out by the exhaust process in the temperature range from 80° to 105° C.

8. A process according to claim 1, wherein dyeing is carried out at a liquor ratio of 1:5 to 1:80.

9. A process for dyeing by the trichromatic technique according to claim 1, which comprises the use of a yellow or orange dyeing mixture of dyes of formulae (1), (2) and (3) together with a blue dyeing mixture of the dyes of formulae (4) and (5) and a red dyeing mixture that contains the dye of formula (6) together with at least one dye of formulae (7), (8) and (9).

10. A process according to claim 1, wherein the fibre material is synthetic polyamide fibre material or wool.

11. A process according to claim 1, wherein the fibre material is a blend of wool and synthetic polyamide fibre material.

12. A dye mixture which comprises the dyes of formulae (1), (2) and (3)

(1)
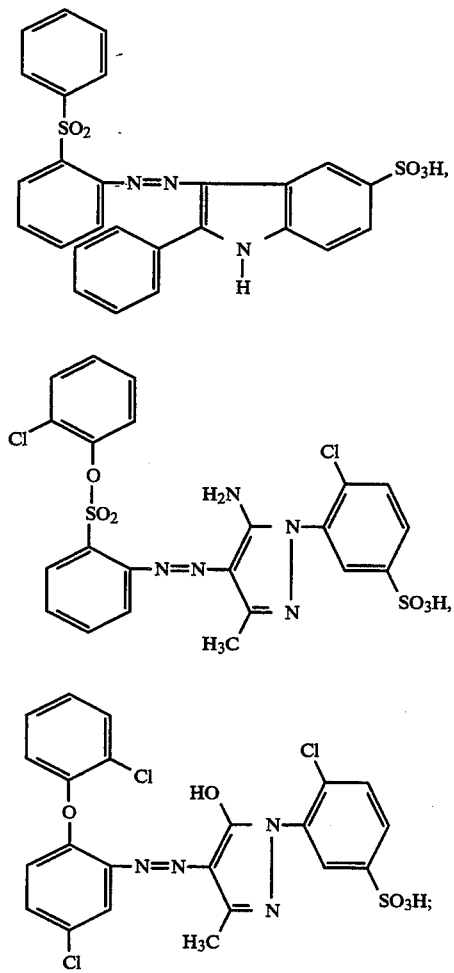
or the dyes of formulae (4) and (5)
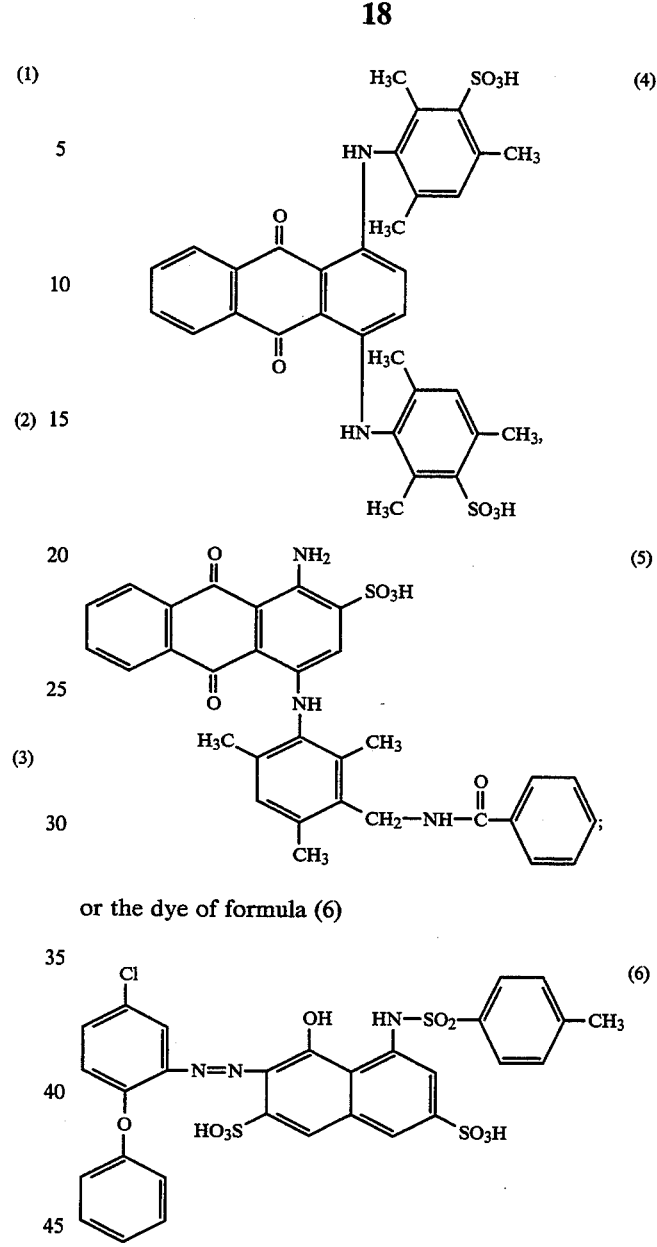
or the dye of formula (6)
together with at least one dye of formulae (7), (8) and (9)
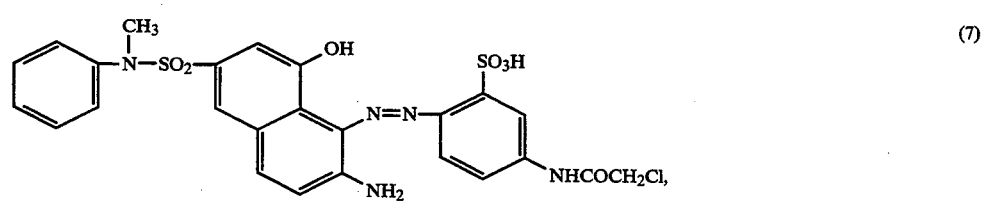

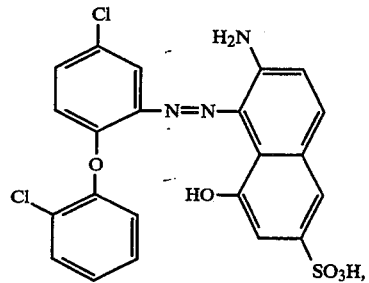
(8)
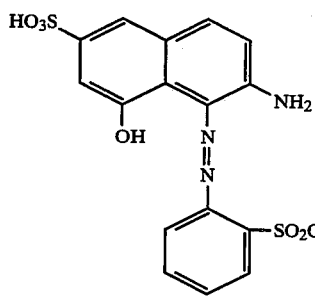 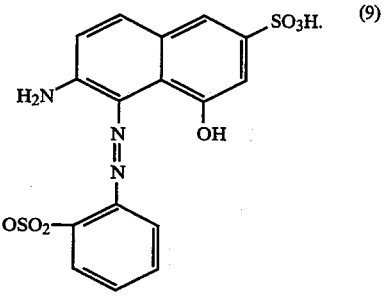
(9)
* * * * *